Figure 1:
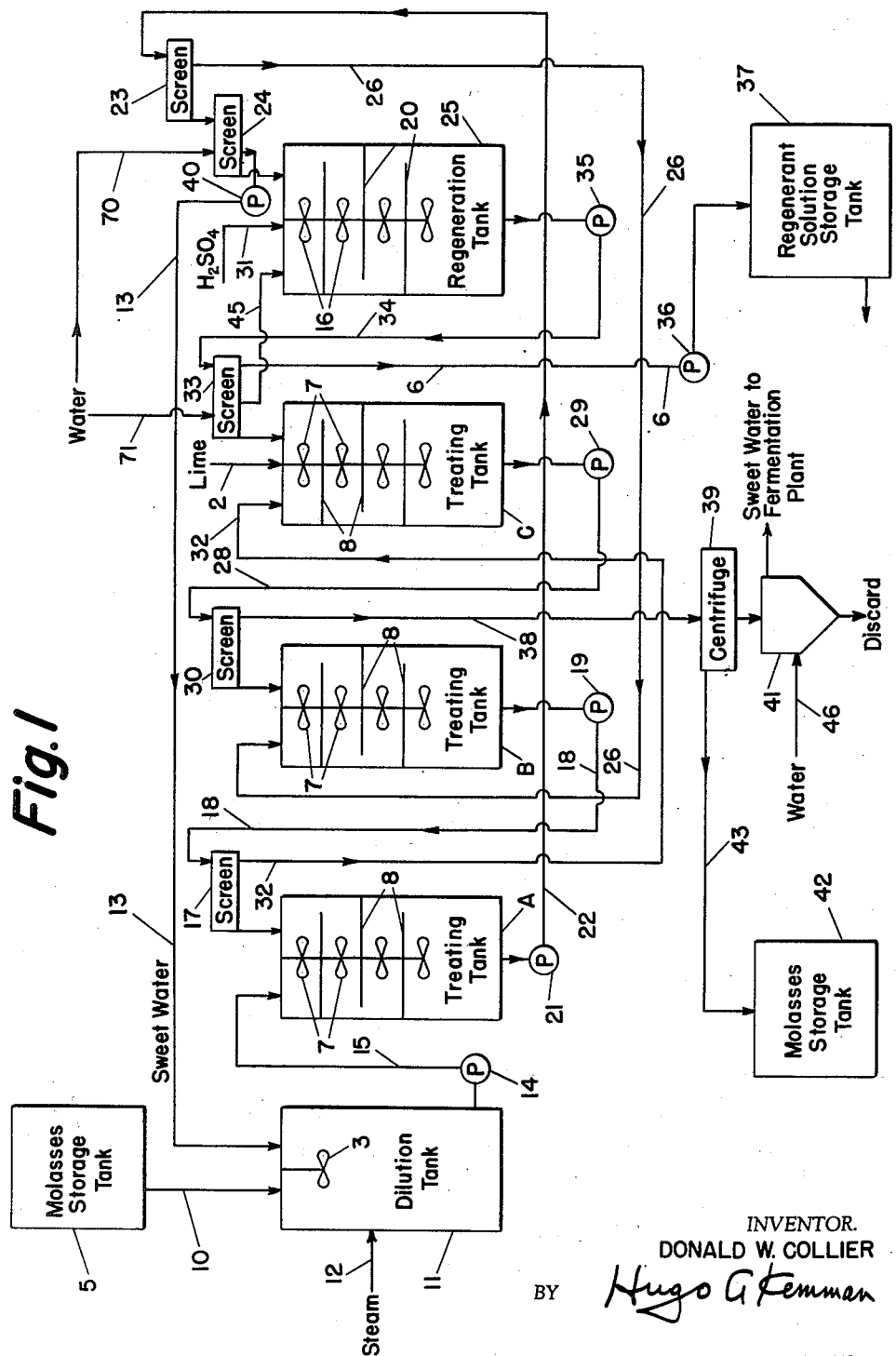

Dec. 21, 1954  D. W. COLLIER  2,697,724
ION EXCHANGE
Filed March 15, 1950  4 Sheets-Sheet 2

INVENTOR.
DONALD W. COLLIER
BY Hugo G. Kenniman
ATTORNEY.

Dec. 21, 1954  D. W. COLLIER  2,697,724
ION EXCHANGE
Filed March 15, 1950  4 Sheets-Sheet 3

INVENTOR.
DONALD W. COLLIER
BY Hugo G. Kimman
ATTORNEY.

Dec. 21, 1954  D. W. COLLIER  2,697,724
ION EXCHANGE
Filed March 15, 1950  4 Sheets-Sheet 4

INVENTOR.
DONALD W. COLLIER
BY
ATTORNEY.

United States Patent Office 2,697,724
Patented Dec. 21, 1954

2,697,724
ION EXCHANGE

Donald W. Collier, Philadelphia, Pa., assignor to The Sharples Corporation, a corporation of Delaware Application March 15, 1950, Serial No. 149,863

9 Claims. (Cl. 260—527)

This invention relates to a process and apparatus for effecting ion exchange in a multi-stage system for continuously separating anions or cations or both in a flowing fluid which is contacted with suitable ion-exchange material for separating the desired ions from the fluid. More specifically, the invention relates to a system for continuously removing selected ions from a fluid by flowing the fluid through a plurality of successive treating stages, maintaining a continuous flow of discrete particles of ion-exchange material in counter-current flow to the fluid, introducing the ion-exchange material at each of the treating stages into confluence with the fluid fed at each treating stage where they are intimately mixed, and flowing the resulting mixture from each of the treating stages to separating means for separating the ion-exchange material from the fluid.

A further feature of my invention resides in providing a system in which the fluid to be treated is introduced in the first treating stage of a series of two or more treating stages and the ion-exchange material which has been separated from the next succeeding treating stage is introduced in the first treating stage, then passing the fluid separated from the first treating stage successively through a series of treating stages and introducing in each of the treating stages the ion-exchange material separated from the next successive treating stage. In such system the ion-exchange material is removed from the first treating stage and separated from the solution treated in the treating stage. The separated ion-exchange material is then delivered to a regenerating stage means to regenerate the exchange material and liberate the adsorbed ions removed from the fluid. The regenerated exchange material is then fed preferably to the last treating stage or to any other stage in the system as may be desired.

My invention is capable of application for the treatment of a large variety of fluids for removing substantially all of a given variety of anions or cations present in a liquid by adsorption on the ion-exchange material fed into the system. The ions so removed can be recovered from the ion-exchange material so that selected ionizable materials present in the liquids treated can be separated and recovered. My invention furthermore is useful for purifying fluids containing undesirable ions which can be completely removed at a comparatively low cost.

Further details and advantages of my invention will be apparent from the following specific embodiments of my process and system with the understanding that this form of description is not intended to imply a limitation of the invention.

Figure 2:
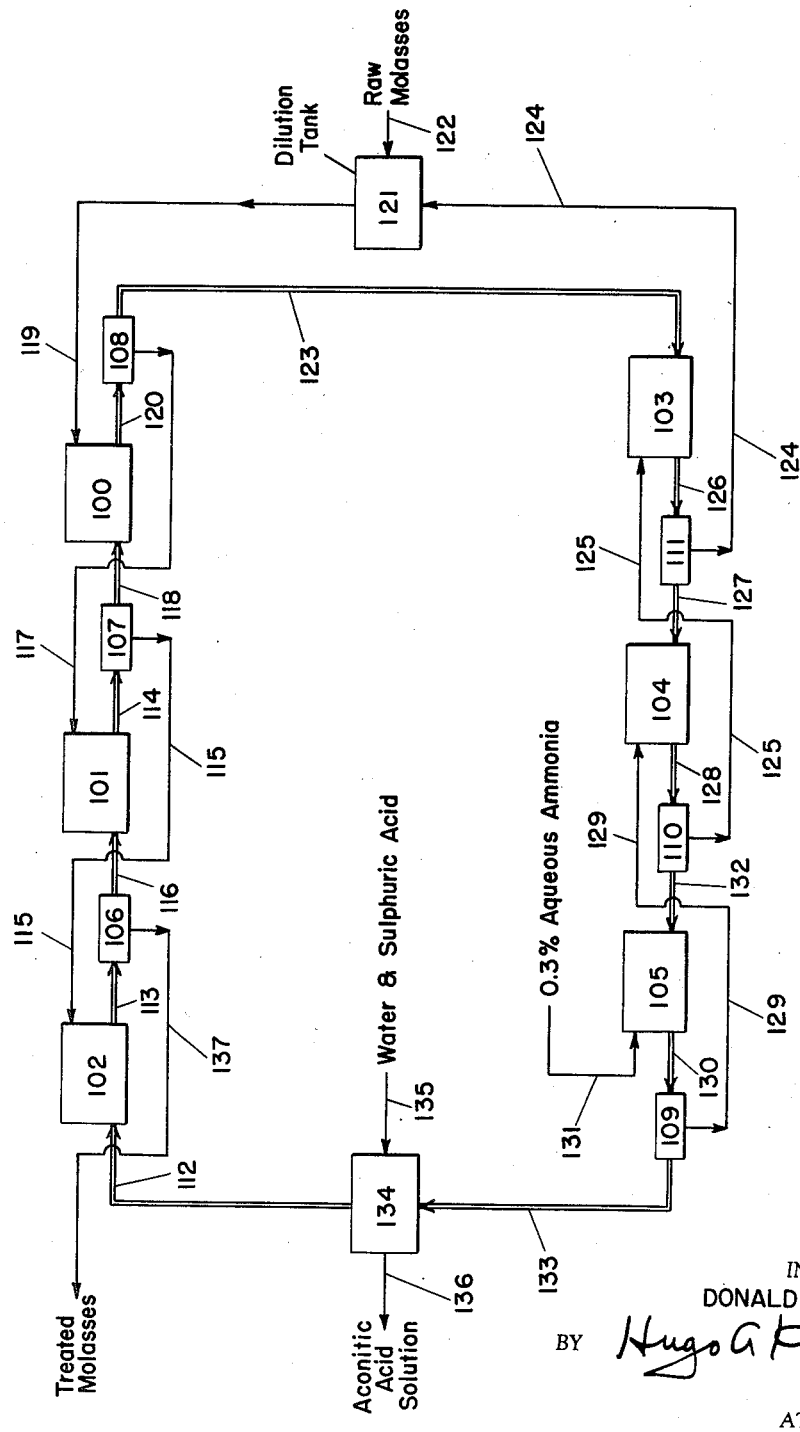
Figure 3:
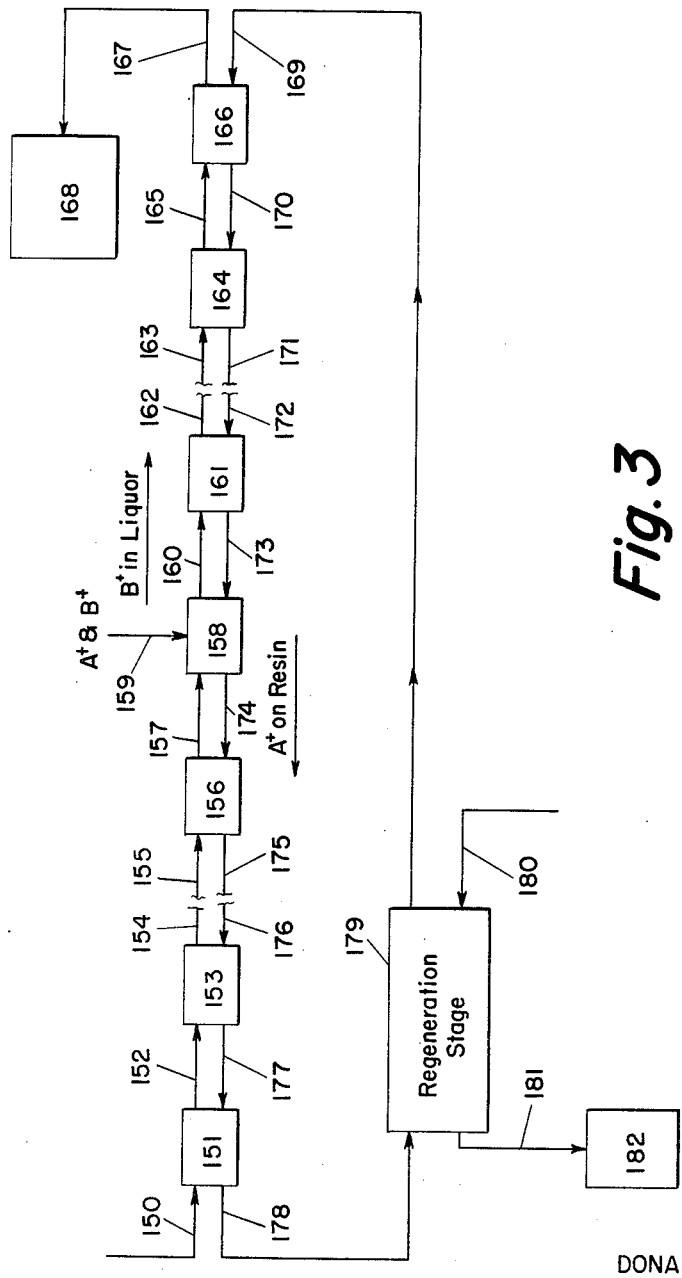
Figure 4:
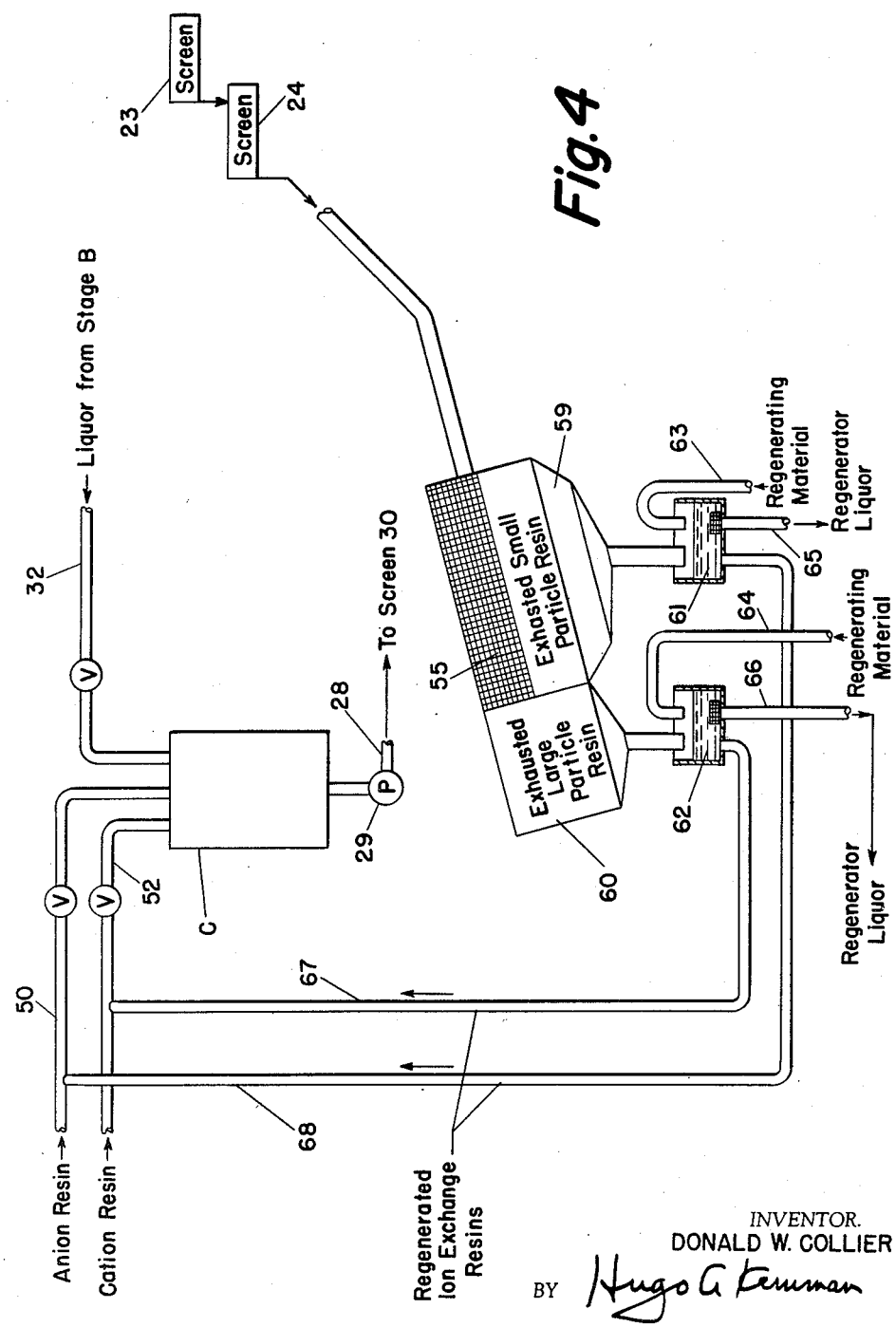

The essential features of my invention, and the manner in which the invention may be practiced in certain of its more important variants, will be better understood by the following specification and accompanying flow sheets, showing a diagrammatic representation of the arrangement of apparatus and flow of materials in which, Figure 1 represents an illustrative system for practicing the invention, Figure 2 represents a modification of the system shown in Figure 1, Figure 3 illustrates another modification of the system shown in Figure 1, and Figure 4 represents another modified system for practicing the invention.

An illustrative embodiment of my invention will be described first in connection with the separation of aconitic acid from blackstrap molasses which is the by-product of raw sugar manufacture. Blackstrap molasses is a heavy viscous liquid separated from the final low grade massecuite from which no further sugar can be crystallized by the usual methods. The density of blackstrap molasses ranges from 85° to 92° Brix, containing total solids by drying of 77 to 84%. The sucrose content varies by weight between 25 and 40% and the reducing sugars from 30 to 12% with total sugars about 50%. It contains anywhere from 0.5 to 5% on Brix of aconitic acid and small amounts of other organic acids such as succinic acid and oxalic acid, and also substantial amounts of mineral salts such as the chlorides, sulfates and phosphates of potassium, calcium, magnesium and sodium.

*Treatment of blackstrap molasses*

In the illustrative system as shown in Figure 1 which will be described in further detail, the raw blackstrap molasses is suitably diluted with water and may be suitably heated. The solution is then treated in a multi-stage counter-current manner with up to about 25% of its diluted weight of an anion exchange resin containing adsorbed mineral acid such as sulfuric acid, hydrochloric acid, phosphoric acid and the like. Lime or other suitable alkaline material is added to the stage in which the anion exchanger first contacts the molasses to adjust the pH within a pH range of about 4 to about 6, and preferably to about 5.0, the point at which the selectivity of the exchanger for aconitic acid over mineral acid is substantially at a maximum. Adjustment of pH is described and claimed in co-pending application Serial No. 150,548, filed March 18, 1950 by Hugh G. Bryce. Each stage comprises a steel treating tank equipped with agitating means which may be heated for example with live steam to maintain the desired temperature for example at about 50° C. Separation of molasses and anion exchange resin between stages is accomplished by any suitable means, such as by the use of vibrating screens.

The exchange resin, having passed through the plurality of stages, is washed with water by any suitable means, such as on a vibrating screen, to remove the adhering molasses and is dropped into the regeneration tank. The sweet water resulting from the wash is used in diluting the raw molasses. Mineral acid, such as sulfuric acid, is continuously added to the regeneration tank at such a rate as to keep the pH of the mixture at a low pH and not exceeding a pH of 2. At this low pH, the exchanger adsorbs mineral acid preferentially to aconitic acid and there results a solution containing aconitic acid and small amounts of any other acids which have been adsorbed on the ion-exchange material and small amounts of mineral acid used as regenerating agent. This solution is separated from the solid exchange material by any suitable means, such as a vibrating screen, and is then subjected to purification and recovery in any suitable manner. The exchange resin is washed for example counter-currently in a plurality of stages on a vibrating screen to remove the remainder of the aconitic acid and some of the mineral acid, such as sulfuric acid from the resin. The exchange resin is now ready to be re-used in the counter-current adsorption stage. The wash-water is used as make-up water in the regeneration tank.

*Three-stage system*

A three-stage system is illustrated in Figure 1 which is suitable for treating blackstrap molasses. The raw blackstrap molasses having for example a Brix of 85° is supplied from a storage tank 5 which is kept at about 50° C. by steam coils and is agitated to keep the temperature uniform and to ensure a uniform feed to the system. The molasses is fed by a suitable supply line 10 to a dilution and mixing tank 11 provided with mixing means 3 where it is heated to about 50° C. by live steam introduced through line 12 and is diluted with water supplied by line 13 to preferably about 50° Brix. The diluted molasses contains both free aconitic acid and its calcium and potassium salts in amount of about 2.4% by weight on Brix solids calculated as free aconitic acid. The liquor is fed through pump 14 and line 15 to a treating tank A provided with suitable mixing means 7 and a series of spaced and stepped baffles 8. A solid subdivided anion exchange resin, for example, such as Ionac A-300, which is an aliphatic amine phenol-formaldehyde resin, is introduced to treating tank A in controlled amount to constitute about 7% by weight of the solution. The exchange resin preferably has a particle size substantially in the 100 to 200 mesh range. The anion exchange resin is supplied from a vibrating screen 17 which separates the anion exchange resin from a slurry fed through line 18 and pump 19 from the second treating tank B. The slurry produced in treating tank A is fed by pump 21 and line 22 to vibrating screen 23 where the resin is first separated from the liquor and is then washed on screen 24 with water supplied by line 70 to remove adhering molasses. The separated exchange resin is then fed to a regeneration tank 25 where it is suitably reactivated in a manner to be described later. The sweet wash-water separated by screen 24 is fed through line 13 by pump 40 to dilution tank 11 for diluting the raw molasses.

The liquor separated by screen 23 is fed by line 26 to the second treating tank B. A stream of exchange resin is fed to treating tank B from a vibrating screen 30 which separates a slurry of exchange resin and molasses liquor supplied by line 28 and pump 29 from the third treating tank C. The slurry produced in treating tank B is fed by pump 19 and line 18 to vibrating screen 17 where the resin exchange material is separated from the liquor and fed to treating tank A as previously described.

The liquor separated by vibrating screen 17 is fed by line 32 to the third treating tank C. Freshly regenerated exchange resin is fed to treating tank C from a vibrating screen 33 which separates the exchange resin from a slurry fed by line 34 and pump 35 from the regeneration tank 25. Lime in the form of an aqueous suspension may be fed by line 2 in sufficient amount to the third treating tank C to adjust the pH of the liquor within a range of about 4 to about 6, and preferably to a pH of about 5. The addition of the lime may be controlled by a pH controller operating in tank C. I may also provide means for adding lime to tanks A and B, if desired, also actuated by pH controls in tanks A and B. In actual operation the normal buffering action of the system makes it unnecessary to adjust the pH in the other treating tanks. By controlling the pH of the liquor fed through the system within the values indicated, the exchange resin will adsorb the aconitic anion in the solution in preference to the mineral acid anions, such as sulfate and chloride. The exchange resin is separated from the first treating tank A and is then fed to the regeneration tank 25.

Sulfuric acid is continuously fed through line 31 to the regeneration tank 25, which is provided with agitating means 16 and baffles 20, at such rate and amount as to keep the pH of the mixture at say 0.9 so as to liberate free aconitic acid. The acid wash-water from screen 33 is also supplied to regeneration tank by line 45. The flow of sulfuric acid to tank 25 may be controlled by a pH controller. The resulting slurry formed in regeneration tank 25 is fed by pump 35 and through line 34 to vibrating screen 33 where the regenerated exchange resin is first separated from the solution, then washed with water supplied by line 71 and then fed to the third treating tank C. The wash-water as previously stated is fed by line 45 to the regeneration tank 25. The washed regenerated exchange material may be fed to a moving belt type weigher, which controls the flow of exchange material to the system in proportion to the flow of raw molasses to the system.

The solution separated by screen 33 containing for example about 2.3% by weight aconitic acid is fed by line 6 and pump 36 to a storage tank 37. This solution is suitably processed in any desired manner to recover aconitic acid, such as for example by the process described and claimed in co-pending application, Serial No. 149,864, filed March 15, 1950, which has matured into Patent 2,650,248, granted August 25, 1953, or the solution containing the aconitic acid fed from screen 33 may, for example, be treated with lime to precipitate calcium aconitate which is filtered out and the filtrate containing any calcium aconitate in solution may be fed back to the system at any suitable point for recovery by the exchange resin.

If desired, the liquor separated by vibrating screen 30 is fed through line 38, where it may be heated by live steam injection, to a centrifuge 39 where the molasses solution, substantially free of aconitic acid anions, is separated from any solid calcium sulfate present in the liquor. This precipitate may also be removed by settling or filtering or may be left in the molasses if it does not interfere with its subsequent use. The treated molasses is then fed to tank 42 through line 43 from which it may be withdrawn for subsequent use, for example, as a fermentation raw material. The calcium sulfate sludge separated by centrifuge 39 is fed to a settling tank 41 which is filled with water to dissolve any adhering molasses. Wash water is supplied to tank 41 through line 46. The sweet water decanted from settling tank 41 is fed to the fermentation plant and the settled calcium sulfate sludge is discarded.

The system as described is particularly suitable for the efficient separation of aconitic acid from blackstrap molasses liquors in which the aconitic acid may be present in amounts ranging up to 5% or more by weight of the solids. I prefer to maintain a temperature of about 50° C. in the treating tanks by heating the tanks with live steam injection or other suitable means when using the specific materials and concentrations previously given. However, I may operate my system at any suitable temperature, such as room temperature, up to the boiling point of the liquor treated depending upon the characteristics of the liquor treated, the chemical structure and particle size of exchange resin used, the proportions of the exchange resin and liquid treated and the adsorption and regeneration rate of the resin exchange used in the system.

My invention is useful in the recovery of aconitic acid from blackstrap molasses and other cane sugar products such as A-molasses, B-molasses of the raw cane mill, also char sweet water, and in fact from any aqueous media containing such acid as in distillery slop resulting from cane molasses fermentation, sorgo juices and the like. I may also separate various organic acids from a wide variety of fruit, vegetable and plant juices and wastes. I may, for example, separate itaconic acid from beet molasses, citric acid from pineapple and citrus fruit wastes, tartaric acid from grape wastes, malic acid from apple juice and wastes, oxalic acid from vegetable juices and wastes and the like. My invention is thus suitable for separating various organic acids which are ionizable in water in extremely weak or high concentrations.

*Anion exchange materials used*

The separation of aconitic acid from molasses may be effected by means of any suitable anionic exchange materials. However, I prefer to use various commercially available organic synthetic resins, such as Ionac A-300, previously mentioned, and Amberlite-1R4B, which are amine phenol-formaldehyde resins; Duolite A-3, which is an aliphatic amine phenol-formaldehyde resin; Nalcite A-1 and A-2, and Amberlite 1RA400, which are strongly basic anionic exchange resins having quaternary nitrogen atoms attached to a hydrocarbon polymer. The specific resin used in my system is selected depending on its stability under the operating conditions used and the number of cycles in which it can be continuously used and reactivated. Ionac A-300, for example, maintains its adsorptive capacity through 60 cycles in my system as previously described without evidence of deterioration. Fresh or regenerated exchange resin may be introduced in the system at any desired stage, preferably in the last treating stage, as required in suitable amounts. If desired, the exchange resin separated at any treating stage may be by-passed out of the system and discarded or fed to the regeneration tank, or otherwise processed as desired.

I prefer to use a resin exchange of a particle size from 100 to 200 mesh as such size particles permit the resin to be readily separated on conventional vibrating screens. However, I may use resin particles of very small size such as 5 microns and replace the vibrating screens in the system with suitable centrifugal separators to separate the resin from the liquor.

The amount of exchange material in the molasses liquor may be greatly varied from about 0 to 25% by weight of the liquor to be treated, and preferably I found it advantageous to employ from about 5 to about 10% by weight of the liquor. The rate of flow of the liquor and slurry in the system is correlated with the contact time desired in each treating stage and preferably so that the exchange resin separated from each treating tank is substantially fully reacted with the solution in which it was suspended. The contact time at any individual stage can be controlled by varying the volume of the mixing tank used at such individual stage. In the system previously described, I have found that about ½ hour total contact time in each tank is adequate for separating the greatest yield of aconitic acid from the molasses liquor. In addition to suitable agitators 7 I may provide suitable baffles 8 in the treating tanks in order to ensure intimate contact and a minimum of by-passing of the exchange resin and liquor while they flow concurrently in the treating tanks. Any suitable number of mixing tanks may be provided in my system and it is therefore to be understood that the use of three treating tanks in the illustrative system is not intended to be restrictive of the invention. When more than three treating tanks are provided, one or more of the tanks may be cut off from the system temporarily for repairs or cleaning if desired. Furthermore, the system may be more flexible in operation by providing one or more spare treating tanks and associated screen and other equipment which can be cut in or out of the counter-current streams of liquor and exchange resin depending upon the conditions desired in the system.

Many variations and modifications may be utilized in carrying out the treatment of molasses as previously described. For example, instead of adding lime to the system in treating tank C as previously described, I may add other acid neutralizing materials such as ammonia, caustic soda or potash, sodium carbonate, calcium carbonate to adjust the pH of the liquor in the system within the optimum range. The lime or equivalent may be added at each treating stage if it is necessary or desirable to maintain a uniform pH value at each treating stage, but generally the pH of the liquor can be adequately controlled at one point or stage of the system.

The regeneration of the exchange resin may be carried out if desired with other mineral acids such as hydrochloric acid or phosphoric acid. The exchange resin may also be regenerated by treating with any alkaline material, such as lime, caustic soda, sodium carbonate or ammonia so as to yield a base regenerated exchange resin. In such case a mineral acid may be added to the system instead of an alkaline material to maintain the pH of the liquor within the desired pH range.

If desired, part or all of the exchange material may be by-passed from any treating stage to the regeneration tank or removed from the system altogether. I may also feed the regenerated exchange material directly from the regeneration tank to any one of the treating stages if desired.

*System having anion stripping and fractionating sections*

If desired, the process illustrated in Figure 1 can be modified to provide for an additional separation of the aconitic acid anions from the other anions found in molasses by treating the anion exchange material in an additional series of contacting stages after it comes from the contacting stage in which it meets the fresh molasses and before it is regenerated. The liquor moving in counterflow to the anion exchange material in this additional series of contacting stages acts to carry off the anions which are adsorbed less strongly than aconitate anions, thereby producing a purification of the adsorbed aconitic acid. In this modification, the untreated molasses is first fed to a stage intermediate to the ends of the series of contacting stages and flows through the section of the series which acts as a stripping section to obtain a high concentration of aconitate anions on the exchanger, thus removing it to a large degree from the molasses. The exchange material, after passing in counterflow to the molasses through this stripping section, passes through another section of the series which acts as a rectification section in that it acts to remove extraneous anions from the exchanger, leaving the aconitate anions in higher purity. The liquor flowing in counterflow to the anion exchange material in this section is water containing sufficient alkaline material to cause a portion of the adsorbed anions, such as aconitate, succinate, and oxalate, as well as any chloride, sulfate and phosphate ions, to be displaced from the exchange material. These displaced anions, carried in the liquor in counterflow to the anion exchange material interact with the anions adsorbed on the exchange material tending to displace into the solution the less strongly adsorbed anions and replace them on the exchange material with more strongly adsorbed anions thereby increasing the purity of the aconitate anions since the aconitate anions are more strongly adsorbed than most of the other anions present under the conditions maintained.

A schematic embodiment of my modified process is shown in Figure 2 for treating blackstrap molasses with an anion exchange material so as to obtain a large fraction of the aconitic acid content of the molasses on the exchange material, and with the subsequent treatment of the exchange material by a counterflow of a water stream containing an alkaline material to effect a purification of the adsorbed aconitic acid.

Referring to Figure 2, I provide a series of treating stages designated by numerals 100, 101 and 102 in which a flowing stream of molasses is successively contacted with a counter-current stream of anion-exchange material. For purposes of clarity the liquor flow in the drawing is designated by a single line and the flow of anion-exchange material by a double line. Each of the treating stages 100, 101 and 102 comprises a baffled treating tank with agitator, similar in construction to the treating stages A, B and C shown in Figure 1, where the aconitate anions in the liquor are stripped or adsorbed from the liquor stream by the anion-exchange material. These treating stages may therefore be designated collectively as the aconitate anion stripping section of the system. The anion-exchange material from the aconitate stripping section is then passed through another successive series of treating stages 103, 104 and 105, which may be designated collectively as the aconitate rectification section of the system, where the adsorbed anions are separated. Each of the treating stages 103, 104 and 105 also comprises a treating tank with agitator and with suitable baffles, similar in construction as shown in stages A, B and C of Figure 1.

Raw blackstrap molasses for example having a Brix of 85° is fed through line 122 to a dilution tank 121, provided with stirring and heating means, where the molasses is diluted with the solution coming from the rectification section through line 124 to about 50° Brix and heated to a temperature of about 50° C. The diluted molasses containing aconitate anions is fed through successive aconitate anion stripping stages 100, 101 and 102 where it is contacted with anion exchange material fed counter-currently to the successive anion stripping stages. The anion-exchange material and liquor are separated by vibrating screens provided at each stage as described in the operation of my system illustrated in Figure 1, so that the freshly regenerated exchange material contacts the liquor in the last anion stripping stage and the incoming molasses liquor contacts in the first stripping stage the exchange material coming from the previous anion stripping stages. Referring again to Figure 2, the diluted molasses liquor is fed by line 119 to the first aconitate anion stripping stage 100 where it contacts the anion exchange material coming from the preceding anion stripping stage 101 through line 118. The slurry from the first stripping stage 100 is then fed to vibrating screen 108 where the exchange material is separated and fed through line 123 to the first stage 103 of the rectifying section. The liquor separated by screen 108 is fed by line 117 to the second anion stripping tank 101 where it contacts the anion exchange material fed by line 116 coming from the third aconitate stripping stage 102. The slurry from the second treating stage 101 is fed through line 114 to vibrating screen 107 where the liquor is separated from the exchange material and is fed by line 115 to the third aconitate anion stripping stage 102. The slurry from the third anion stripping stage 102 is fed through line 113 to vibrating screen 106 where the molasses liquor is separated and is fed through line 137 to a centrifuge if desired and then to a molasses storage tank. The exchange material separated by screen 106 is fed by line 116 to the second aconitate anion stripping stage 101 as previously described.

The operation of the aconitate anion fractionating or rectifying section of the system will now be described where the anion exchange material having aconitate anions and other anions adsorbed thereon is treated to increase the ratio of aconitate anions to other anions. As previously described, the anion exchange material coming from vibrating screen 108 is fed through line 123 to the first contacting or treating tank 103 of the anion fractionating section where it contacts the liquor fed through line 125 from vibrating screen 110. The size of tank 103 is such as to achieve an effective time of contact of about 15 minutes. The slurry of liquor and exchange material is continuously removed from tank 103 through line 126 to vibrating screen 111, where the exchange material and liquor are substantially separated, the liquor being fed through line 124 to dilution tank 121 where it is used to dilute the incoming molasses, and the exchange material is fed through line 127 to treating tank 104. The slurry coming from tank 104 is fed to vibrating screen 110 by means of line 128. The liquor coming through the screen 110 is fed to tank 103 as previously described by means of line 125, and the separated exchange material is fed to treating tank 105 by means of line 132. A 0.3% aqueous ammonia solution is fed to tank 105 to amount to about 70% of the weight of raw molasses being treated. The slurry flowing from tank 105 is passed to vibrating screen 109 by means of line 130. The liquor coming from screen 109 is fed to tank 104 by means of line 129 and the separated exchange material is fed to regeneration tank 134 by means of line 133 where it is treated as disclosed in the first specific example previously described. The aconitic acid solution obtained by regenerating the anion exchange material which has been treated in this manner will contain fewer impurities than that obtained without the use of the treating stages 103, 104 and 105 which constitute a rectification or purification section. It may therefore be advantageous to use this modification of my system when a product containing few impurities is desired.

My invention may be used to separate any two anions which can be dissolved in the same solvent and for which the exchanger exhibits different affinities and this separation can be effected to any degree found desirable. In general, the number of contacting stages required for a given degree of separation is dependent on the difference in the affinities of the exchanger for the anions being considered under the conditions existing in the contacting stages. The number of contacting stages in the stripping section of the system is dependent on the degree to which it is desired to remove the anion which is adsorbed more strongly from the solution passing through that section, while the number of contacting stages in the rectifying section is dependent on the degree to which it is desired to remove the anion adsorbed less strongly, from the exchanger passing through that section.

In order for the rectifying section of the system to be most effective, it is preferable to feed back some of the anion which is adsorbed most strongly into the liquor which is flowing in counterflow to the exchange material. The feed back may be brought about by introducing this strongly adsorbed anion in the liquor which is being fed into the rectifying end of the train, either as a soluble salt or as a soluble acid, whichever may be desired in a particular separation. Alternatively, an alkaline material such as ammonia, caustic soda, lime or the like, may be introduced into the rectifying section of the system along with the liquor flowing through that section. This has the effect of supplying the desired anion in the liquor by desorbing it from the exchange material. In some cases it may occur that a sufficient quantity of the strongly adsorbed anion is desorbed from the exchange material into the liquor flowing through the rectification section by the exchange material approaching equilibrium with the liquor so that the desired concentration of the anion is achieved without the addition of any additional materials.

If the conditions of a particular separation are such that a certain anion can be tolerated as a contaminant of the anions being separated, for example, if the certain anion can be easily separated from the anions being separated by a precipitation, then that anion can be used as a displacing anion, as a soluble salt or a soluble acid containing the certain anion used to produce the feed back. That is, the salt or acid of the certain anion can be added to the liquor flowing through the rectification section of the train, and the interaction of this anion with the anions adsorbed on the exchanger will produce the necessary feed back of the anions being separated. For instance, sodium chloride can be introduced in the aconitate purification train described above instead of ammonia, since chloride and aconitate ions can easily be separated by precipitation of the latter with calcium ions.

In addition, control of pH in the rectification stages is advantageously practiced in order to maintain a maximum selectivity of the exchanger for the ion being purified. This can be accomplished by addition of suitable alkaline or acid materials as previously described.

*Cation exchange systems*

My system and process may also be utilized for treating any liquid containing cations which are desired to be removed either for the purpose of purifying the liquor or for recovering the desired cation. My system can be operated for this purpose with a suitable cation exchange resin which is then suitably regenerated and reused in my system in the same manner as previously described. For example, after the molasses liquor has been treated with an anionic exchange resin as previously described to remove aconitic anions or other anions, the final molasses liquor issuing from the system may be fed to another multi-stage system similar in operation to the anionic-exchange system previously described except that a cationic exchange material containing replaceable sodium ions is used in the second system to remove Ca ions from the liquor.

*Cation separation system*

The counter-current principle can be extended in the case of cation exchange to provide a separation between two types of cations just as it was in the case of the anion separation previously discussed.

A specific example of such a system is shown schematically in Figure 3 in which a cation exchange resin such as Zeocarb, which is a sulfonated coal; Ionac C–200, which is a phenol-formaldehyde sulfonate, or Amberlite 1R–100, which is a modified phenol-formaldehyde sulfonic acid type resin, or any other suitable cation exchanger, is passed counter-currently to a liquor through a plurality of stages 151, 153, 156, 158, 161, 164 and 166, consisting of, for example, a baffled mixing tank with agitator and a vibrating screen such as shown in Figure 1, or any other suitable means for mixing, and then separating the resin and liquor, in order to separate two cations, A and B (for example, $K^+$ and $Na^+$) one of which, say A, is more strongly adsorbed than B. The two cations, A and B, are fed into the extraction train at a point intermediate to its ends, the optimum stage being determined by the ratio of A to B in the mixture, through line 159 into stage 158, preferably in the form of a relatively concentrated solution of their salts which are soluble in the liquor in the train or as a dry mixture of such soluble salts. In stage 158, a somewhat higher ratio of A to B is adsorbed on the resin than existed in the streams being fed to it, leaving a somewhat lower ratio of A to B in the liquor. The resin and liquor thus reacted, are then separated and respectively fed through line 174 into stage 156 which constitutes the first rectification stage, and through line 160 into stage 161. The resin is contacted in stage 156 with liquor containing a mixture of A and B but richer in A than was the mixture in the liquor in 158 and therefore the ratio of A to B adsorbed on the resin in 156 is higher than was adsorbed on it in stage 158. This resin is separated from the liquor and fed to succeeding stages through line 175, while the separated liquor is fed back into stage 158 which constitutes the first stripping stage. Conversely in stage 161, the mixture in the liquor passed through line 160 is contacted with resin less rich in A than itself and thus the ratio of A to B in the liquor is further lowered. The separated liquor is passed through line 162 to succeeding stages and the resin from stage 161 is passed through line 173 to stage 158. In this manner cation A tends to be moved to the left in the resin phase and cation B tends to be moved to the right in the liquor phase. By repeating the process in succeeding stages, the resin in stages 151 and 153 contains relatively B-free A and the liquor in stages 164 and 166 tends to contain relatively A-free B. The separation between A and B desired will determine the number of stages in the train. Therefore most of the cation B fed into the system through line 159 can be removed from the system in the liquor through line 167 to storage tank 168 from which it can be withdrawn for use as such or sent to any suitable process to recover B in the form of one of its compounds from the liquor. Likewise most of A fed into the system through 159 can be removed on the resin through line 178.

A can be recovered from the resin and the resin can be "regenerated" for reuse in any suitable apparatus, for example, that shown in Figure 1 by tank 25 and screen 33. Such a combination has been diagrammed in Figure 3 by regeneration stage 179. Into regeneration stage 179 are fed the resin through line 178 containing most of the cation A and an aqueous solution through line 180 containing a displacing ion, for example, the liquor fed through line 180 may be a solution of a mineral acid such as sulfuric or hydrochloric or the like. After reaction, the resin and liquor are separated and the liquor containing substantially all of the A cation originally on the resin is fed through line 181 to storage tank 182 from which it may be withdrawn for subsequent use or recovery of A, and the resin is recycled to the system through line 169.

Through line 150 a liquor is introduced into the extraction train which contains a displacing ion in a relatively lower concentration than in the regeneration stage. The ratio of liquor to resin in the extraction train and the concentration of the displacing ion introduced through line 150 may vary somewhat but preferably should be adjusted so that about half of the A and B ions in each stage are in the liquor phase.

The displacing ion introduced through line 150 and into the regeneration stage may be $H^+$, a third cation which is preferably easily separated from A and B, or in fact, A itself may be introduced through line 150 to serve as reflux. It is required, however, that the ratio of A to B in the ions introduced through line 150 be not less than that on the resin passing through line 178 and likewise the ratio of B to A on the resin introduced into 166 through line 169 should not be less than that existing in the liquor in line 167.

A specific, but not limiting, example of the general technique outlined above is shown by the partial separation of sodium and potassium chlorides in a three-stage system described below.

A quantity of a modified phenol-formaldehyde sulfonic acid cation exchange resin (Amberlite IR–100) was pretreated by slurrying in three volumes of 2 N. hydrochloric acid for five minutes and decanting the supernatant liquor. This procedure was repeated for a total of five times, after which the exchange resin was washed with distilled water until the effluent pH was above 4.0 and allowed to air dry overnight. The exchange resin was then passed through a three-stage counter-current extraction train with center feed, such as was described previously and is illustrated diagrammatically in Figure 3. Operation of the train was carried out by charging 10 g. of the cation exchange resin to the first stage, 10 ml. of feed solution containing 0.33 g. KCl and 0.33 g. NaCl per 10 ml. to the center stage, and 100 ml. of 0.06 N. HCl to the last stage. The contents of each stage were stirred for five minutes and allowed to settle. The liquid phase in each stage was then decanted and placed in the preceding stage, and the wet exchange resin in each stage was advanced to the next succeeding stage. Another batch of cation exchange resin, feed solution, and 0.06 N. HCl solution was then charged to the stages previously mentioned and the cycle repeated a total of twelve times to insure substantially steady stage operation. After the completion of these cycles, the solution coming from the first stage was analyzed and found to contain 0.07 g. KCl and 0.17 g. NaCl. The wet cation exchange resin coming from the last stage was placed in a ½″ I. D. glass column and elutriated with 150 ml. of 1 N. hydrochloric acid solution at a flow rate of 3 ml. per minute to remove substantially all the adsorbed metal cations. The eluate was found to contain 0.25 g. KCl and 0.17 g. NaCl.

As is well known, chemical methods for separating sodium and potassium ions involve the use of dangerous chemicals, such as perchloric acid, or expensive chemicals, such as chloroplatinic acid; and, therefore, an ion exchange method is cheaper and safer. A much more complete separation could, of course, be achieved by the use of additional stages.

*Mixed ion exchange systems*

I may also use a mixed cationic and anionic exchange material in practicing my invention to remove simultaneously in a single system both anions and cations in the liquor. The cation and anion exchange resins can be mixed in suitable amounts so as to maintain the pH of the liquor within the desired predetermined range and the two resins can be separated by means of the difference in their physical properties, such as their particle size or specific gravity, and separately regenerated and returned to the system as disclosed in my co-pending application Serial No. 707,490, filed November 2, 1946, now Patent No. 2,563,006.

The present invention is not limited to the employment of a particular type of ion-exchange material, to the use of cation exchange resins operating on a hydrogen cycle and anion exchange resins operating on a base regenerated cycle, nor is it concerned with the preparation of these materials. The preparation of anion exchange materials has been described in Patents 2,151,883, 2,354,671, 2,251,234, 2,246,527 and others. Cation exchange materials of an organic nature are described in Patents 2,204,539, 2,391,831, 2,319,359 and others. Carbonaceous zeolite materials acting on a hydrogen cycle are described in Patents 2,191,059, 2,376,896 and others. These types of materials and many others, whether of a resinous organic nature or a nonorganic type, may be used in the present invention. By proper control of the relative amounts of base regenerated anion exchange material and acid regenerated cation exchange material employed relatively fine control of pH can be obtained and the hazards of losing valuable materials which might otherwise be decomposed by acid or basic media can be minimized. By careful control of the relative amounts of anion and cation exchange materials added, the pH of the treated liquid may be held at a favorable operation condition throughout a continuous ion exchange treatment.

When a mixture of anionic and cationic exchange materials is used in my multi-stage system as described, I may utilize the equipment as illustrated in Figure 4 in conjunction with the system illustrated in Figure 1 to provide for the separation and separate regeneration of the exchange resins which are then mixed and fed back to the system.

Referring to Figure 4, a solid cation resin of large particle size, for example, 20–40 mesh, is fed through a conduit 52 into tank C which is the same tank C in Figure 1, and a solid anion resin of small particle size, for example, 100–200 mesh, is fed through a conduit 50 into tank C. The liquor flows to the tank C through line 32 from the preceding stage B. From the tank C the mixture is fed through the multi-stage system as shown in Figure 1 until the mixed resin is separated by screen 23 and washed in screen 24 which feeds the mixed resin to sieve 55.

The sieve allows the small sized particles of the anion resin to pass into a hopper 59. The large sized particles of the cation resin pass out of the end of the sieve into a hopper 60. From the hoppers 59 and 60 the resins flow into containers 61 and 62 in which they are separately regenerated with regenerating materials passed into the containers through conduits 63 and 64. The regenerating liquors of the regeneration treatment flow out through conduits 65 and 66, and the regenerated ion exchange resins are returned to the system through conduits 67 and 68.

When it is desired, for example, to separate aconitic acid ions from the molasses liquor, the cation resin, in the hydrogen form, and the anion resin, in the hydroxyl form, are added in such a ratio that the pH of the molasses liquor is controlled in the range from about 4 to about 6 during the treatment. The cation resin, by exchange with ions such as calcium and potassium supplies the necessary hydrogen ions to maintain the proper pH as the aconitic acid is adsorbed on the anion resin exchanger.

The resins are then separated from the molasses liquor and each other for regeneration and recovery of the aconitic acid therefrom. The cation resin is regenerated with acid and recycled to the system. If it is desired to recover the aconitic acid in the free acid form, the anion resin is first treated with a strong mineral acid to displace the aconitic acid from the resin. The anion resin is then regenerated with an alkaline material such as aqueous ammonia, sodium hydroxide or the like. If the preliminary acid treatment of the anion resin is omitted, a solution of ammonia, sodium or other metal, aconitate results from the base regeneration step. This solution can then be converted to aconitic acid by well-known procedures.

The advantages of the foregoing process are that a partial purification of the molasses results from the treatment and therefore the recoverability or usability of sugar is enhanced and the scaling problems during evaporation of the liquor are decreased, particularly since both calcium and aconitate ions are bad scale formers. In addition, since the cation resin allows the addition of the necessary hydrogen ions without any accompanying anions, a cheap acid such as sulfuric can serve as the source of these ions without introducing scale-forming substances into the molasses.

A mixture of anion and cation exchange materials may also be used in a train of contacting means in which the ions to be separated are fed intermediate to the ends of the train, dividing the train into a rectifying section and a stripping section, similar to the system shown in Figure 2. The material used to obtain a feed back of ions in the rectifying section of the train is dependent on the objective of the treatment. If the objective is a separation of anions and the cation exchange material is used to control the pH during the adsorption, the material used to obtain a feed back of the anions being separated may be any of those suggested previously for the system employing an anion exchange material only. Similarly, if the objective of the treatment is a separation of cations and the anion exchange material is used to control the pH during the adsorption, the material used to obtain a feed back of the cations being separated may be any of those mentioned previously for the system employing a cation exchange material only. If the objective of the treatment is to obtain a simultaneous separation of particular anions and cations, the material added to the liquor flowing through the rectifying section of the train may be a salt composed of the anion and cation which is desired in relatively pure form on the exchange materials coming from the rectifying section of the train. Or, if desired, the material may be the alkali of the cation which is most strongly adsorbed on the cation exchange material. The material may be an acid containing the anion which is adsorbed most strongly on the anion exchange material, or it may be a salt containing both anion and cation which can readily be separated from the anions and cations being separated.

Numerous advantages of my invention will be apparent from the foregoing description. A wide selection of ion exchange materials may be used in practicing my invention both as regards their ion adsorption characteristics, selectivity and regenerative capacity. Furthermore, solid ion exchange materials of any suitable particle size may be used which can be suspended or mixed in the liquors to be treated from which they can be readily separated and reused. The exchange materials are used in a continuously flowing system in counter-current flow to the fluids being treated so that greater capacity is achieved in using a given amount of exchange materials as compared to a fixed bed operation. In accordance with my invention it is possible to recover valuable substances from dilute solutions thereof at comparatively low cost as compared with usual chemical recovery methods. My invention may also be used for purifying a large variety of substances by removing foreign substances therefrom.

Obviously my invention is capable of wide industrial application and it is to be understood that the specific examples given herein are intended to be merely illustrative embodiments of my invention. Other modifications within the scope of the invention will be apparent to those who are skilled in the art which are intended to be included within the scope of the appended claims.

I claim:

1. A continuous process for removing aconitic acid anions from an aqueous solution of molasses which comprises continuously flowing said solution through a plurality of successive treating stages, maintaining the pH of the solution within a range of from about 4 to about 6, maintaining a continuous flow of solid particulate anionic exchange material in counter-current flow to said solution, introducing said anionic exchange material at each of said treating stages and intimately mixing same with the solution in said stage, co-currently flowing said mixture from each of said treating stages to a separating stage and separating said solid exchange material having the aconitic acid anion adsorbed thereon from the solution.

2. A process for continuously separating organic acid anions from an aqueous solution containing organic acid anions and mineral acid anions which comprises continuously flowing said solution successively through a plurality of treating stages, maintaining the pH of said solution within a range of from about 4 to about 6, continuously contacting said solution with an anion-exchange material at each of said stages to adsorb organic acid anions thereon, continuously removing said anion-exchange material at each of said stages and advancing the same from stage to stage in a direction opposite to the flow of said solution, and thereafter treating said anion-exchange material to recover organic acid anions adsorbed thereon.

3. A process for separating ions of a given polarity from other ions of the same polarity but different chemically by the use of ion exchange material which comprises advancing ion exchange material capable of adsorbing said first-mentioned ions more strongly than said other ions from one end of and successively through a series of at least three treating stages, introducing a solution containing said first-mentioned and said second-mentioned ions into a treating stage intermediate the ends of said series and advancing said solution successively through said series of treating stages from the point of its introduction to that end of said series from which said ion exchange material is advanced, and advancing from the other end of and successively through said series of treating stages a solution containing ions having a greater affinity for said ion exchange material than said other ions, said last-mentioned solution being capable at most of displacing from said ion exchange material a portion only of said first-mentioned ions.

4. The process of claim 3 in which the ions in the last-mentioned solution are identical with the ions first-mentioned in said claim.

5. The process of claim 3 in which the first-mentioned solution is an aqueous solution of molasses containing aconitate anions and mineral acid anions, in which the ion exchange material is anion exchange material, and in which the pH in each of the treating stages through which said first-mentioned solution is advanced is maintained between 4 and 6.

6. The process of claim 3 in which the first-mentioned solution is an aqueous solution of molasses containing aconitate anions and mineral acid anions, in which the ion exchange material is anion exchange material, in which the pH in each of the treating stages through which said first-mentioned solution is advanced is maintained between 4 and 6, and in which the ions in the last-mentioned solution are aconitate anions.

7. The process of claim 3 in which the ion exchange material is a mixture of anion exchange material and cation exchange material.

8. The process of claim 3 in which the ion exchange material is a mixture of anion exchange material and cation exchange material, in which the first-mentioned solution is an aqueous solution of molasses, and in which the ratio of anion exchange material to cation exchange material is such as to maintain the pH in the treating stages between 4 and 6.

9. A process for separating ions of a given polarity from other ions of the same polarity but different chemically by the use of ion exchange material which comprises introducing a solution containing said first-mentioned and said second-mentioned ions into an ion exchange system intermediate the ends thereof and advancing said solution through said system from the point of its introduction to one end of said system, advancing ion exchange material capable of adsorbing said first-mentioned ions preferentially to said other ions through said system from said first-mentioned end of said system to the other end thereof, and advancing from said other end of and through said ion exchange system to said first-mentioned end an ion containing solution capable of displacing from said ion exchange material at least a large part of said other ions, said last-mentioned solution being capable at most of displacing from said ion exchange material a portion only of said first-mentioned ions.

(References on following page)

References Cited in the file of this patent

UNITED STATES PATENTS

| Number | Name | Date |
|---|---|---|
| 1,707,302 | Godsey | Apr. 2, 1929 |
| 2,137,430 | Webb | Nov. 22, 1938 |
| 2,151,883 | Adams et al. | Mar. 28, 1939 |
| 2,228,514 | Griessbach et al. | Jan. 14, 1941 |
| 2,341,907 | Cheetham et al. | Feb. 15, 1944 |
| 2,388,195 | Vallez | Oct. 30, 1945 |
| 2,413,844 | Rawlings | Jan. 7, 1947 |
| 2,461,505 | Daniel | Feb. 15, 1949 |
| 2,469,683 | Dudley | May 10, 1949 |
| 2,470,339 | Claussen et al. | May 17, 1949 |
| 2,481,557 | Ambler et al. | Sept. 13, 1949 |

FOREIGN PATENTS

| Number | Country | Date |
|---|---|---|
| 540,232 | France | Apr. 13, 1922 |
| 578,520 | Great Britain | Sept. 28, 1944 |

OTHER REFERENCES

Balch et al.: Chem. Abstracts, vol. 39, col. 5524 (1945).

Myers: "Fiat Final Report No. 715" (Office of Military Gov't), page 20 (November 1, 1946).

Almeida: Chem. Abstracts, vol. 41, cols. 1859–60 (1947).

Mariani: Chem. Abstracts, vol. 42, col. 8002 (1948).

Nachod: "Ion Exchange" (Academic Press), pp. 62, 72, 151, 157, 306 (June 21, 1949).

Ind. and Eng. Chem., vol. 41, page 460 (1949).